United States Patent [19]
Hall et al.

[11] Patent Number: 4,841,724
[45] Date of Patent: Jun. 27, 1989

[54] ROCKETS

[75] Inventors: John M. Hall, Nr. Bristol; Roger Hurd, Bristol; Geoffrey H. E. Wright, Bath, all of England

[73] Assignee: Rolls-Royce plc, London, England

[21] Appl. No.: 822,959

[22] Filed: Aug. 3, 1977

[30] Foreign Application Priority Data

Aug. 17, 1976 [GB] United Kingdom ............... 34243

[51] Int. Cl.⁴ .............................................. F02K 7/18
[52] U.S. Cl. ............................. 60/245; 60/257; 60/270.1; 60/749
[58] Field of Search .............. 60/39.72 R, 39.74 A, 60/224, 225, 244, 245, 246, 250, 251, 270 R, 270 S, 749, 270.1, 374; 102/49.4, 49.5

[56] References Cited

U.S. PATENT DOCUMENTS

| | | | |
|---|---|---|---|
| 3,038,408 | 6/1962 | Kluge | 60/270.1 |
| 3,236,048 | 2/1966 | Spears | 60/39.72 R |
| 3,482,403 | 12/1969 | Polk | 60/270.1 |
| 3,802,192 | 4/1974 | Curran | 60/270 R |
| 4,028,886 | 6/1977 | Hackett | 60/270.1 |
| 4,327,886 | 5/1982 | Bell et al. | 60/245 |
| 4,562,699 | 1/1986 | Rowe et al. | 60/270.1 |

Primary Examiner—Stephen C. Bentley
Attorney, Agent, or Firm—Oliff & Berridge

[57] ABSTRACT

An integrated rocket ramjet in which initial acceleration of the rocket is achieved by a rocket fuel propellant and subsequent flight is sustained by a ramjet engine receiving air via a supersonic diffuser from an inlet disposed at the middle of the rocket. The flame for the ramjet combustion system is incorporated into the diffuser so that diffusion and combustion take place simultaneously. The combustion process continues within the space previously occupied by the rocket fuel propellant and the walls bounding this space are the outer casing of the rocket and are directly cooled by free stream air flowing past the rocket.

2 Claims, 3 Drawing Sheets

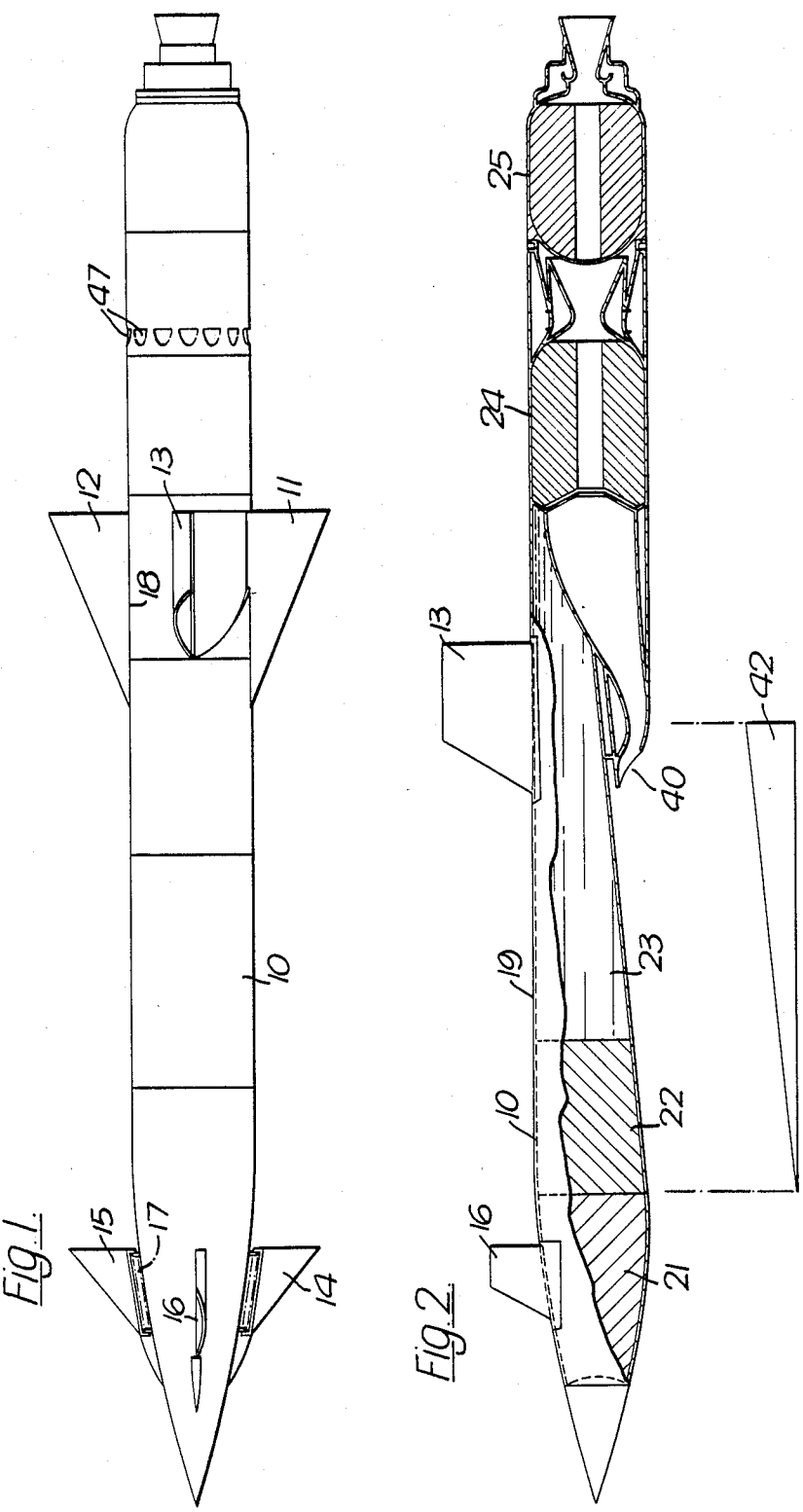

ROCKETS

This invention relates to improvements in rockets and has particular reference to an integrated rocket ramjet.

The evolution of rocket designs and in particular missile designs has resulted in a trend towards dividing the rocket into two portions a forward guidance and payload portion and a rearwardly disposed propulsion assembly.

A typical propulsion assembly comprises a rocket fuel propellant chamber and a ramjet combustion system disposed upstream of the chamber and operative, after burning of the rocket fuel propellant, with air received from an inlet or inlets.

The inlet or inlets may be stowed within the generally cylindrical body of the rocket to facilitate launching the rocket and to prevent the creation of excessive drag during acceleration of the rocket by the rocket fuel. In one rocket type four inlets are provided and, on reaching a sufficient speed, covers are blown off the intakes by small explosive charges and the inlets swing outwardly to scoop in the required air for the ramjet combustion system. Unfortunately, such inlets increase the complexity of the rocket and their presence could adversely affect cooling of the ramjet combustion chamber by disturbing the airflow over the outer surface of the rocket downstream of the inlets.

Furthermore, during manoeuvring of the rocket, the inlet conditions at each of the inlets varies which complicates the inlet flow to the combustor. In another rocket type a single inlet mounted near the nose of the rocket passes air via a duct to the rear of the rocket to support the combustion of fuel at a combustor positioned ahead of the rocket fuel propellant chamber.

In both of the foregoing rocket arrangements combustion is initiated at a flameholder positioned downstream of a diffusing passage. In this diffusing passage air received from the inlet(s) undergoes firstly a supersonic diffusion process and then a subsonic diffusion process. The combustion process proceeds downstream of the flameholder within the rocket fuel propellant chamber before subsequent discharge from the rocket via a propulsion nozzle at the downstream end of this chamber.

The present invention seeks to provide a rocket which results in a more efficient use of the space available within the rocket for carrying fuel or other payloads, which utilizes an intake which is less adversely affected by the flow of air past the rocket and which allows the rocket fuel propellant chamber to be directly cooled by this flow of air.

According to the present invention there is provided a rocket having at its rearward end a propulsion assembly, the assembly comprising a chamber capable of accomodating a rocket fuel propellant, a diaphragm disposed at the forward end of the chamber and capable of withstanding the pressure of burning rocket fuel propellant within the chamber, a diffusing passage ahead of the chamber and communicating with an inlet at the side of the rocket adjacent a central portion of the rocket, a flame holder disposed within the diffusing passage, the diaphragm being disposable following use of the rocket fuel propellant to allow the combustion within the chamber of further fuel supplied to the flame holder with air received from the inlet and wherein the chamber wall is part of the rocket casing and is directly cooled during said combustion by the passage of air past the rocket.

A feature of this construction is the incorporation of the flame holder into the diffusion passage resulting in an overall shortening of the propulsion assembly and thus a saving of space.

In distinction to known flame holders which are situated downstream of a diffusion passage so that the air inlet velocity thereto is already at a relatively low subsonic Mach number the present flame holder is placed within the diffusion passage at a position corresponding to a relatively high subsonic Mach number and portions of the incoming air are progressively diffused into the flame holder at successive axial positions along the flame holder. Each portion is locally diffused to a relatively low subsonic Mach number as it enters the flame holder prior to combustion taking place within the flame holder and the flow past the outside of the flame holder is also progressively diffused as the flow proceeds in a downstream direction. This integrated diffusion and combustion process can be considered as enabling the angle of the diffusing passage to be increased beyond the limiting angle of about seven degrees which ordinarily places a limit on the efficiency of a diffuser and thus the diffuser itself is also effectively shortened.

In one embodiment the flame holder comprises a tubular assembly of longitudinally extending peripherally spaced longerons and longitudinally spaced hoops attached to the longerons and defining a number of openings for the passage of air, the hoops being shaped to deflect, in operation, air flowing along the outside of the assembly inwards through the openings for discharge inside the assembly and to diffuse this air to a lower velocity within the assembly, there being an intake mouth for the assembly at the upstream end therefore and a fuel discharge nozzle at the downstream end of the mouth and the sides of the mouth being shaped to diffuse, in operation, air flowing through the mouth into the assembly to establish a pilot combustion zone at the upstream end of the assembly.

The rocket may also be provided with an additional boost rocket disposed in well-known manner downstream of the chamber.

Embodiments of the invention will now be described by way of example only and with reference to the accompanying drawings in which:

FIG. 1 is a plan view of a missile,

FIG. 2 is a vertical section through the missile of FIG. 1 to a reduced scale,

Figure 3:
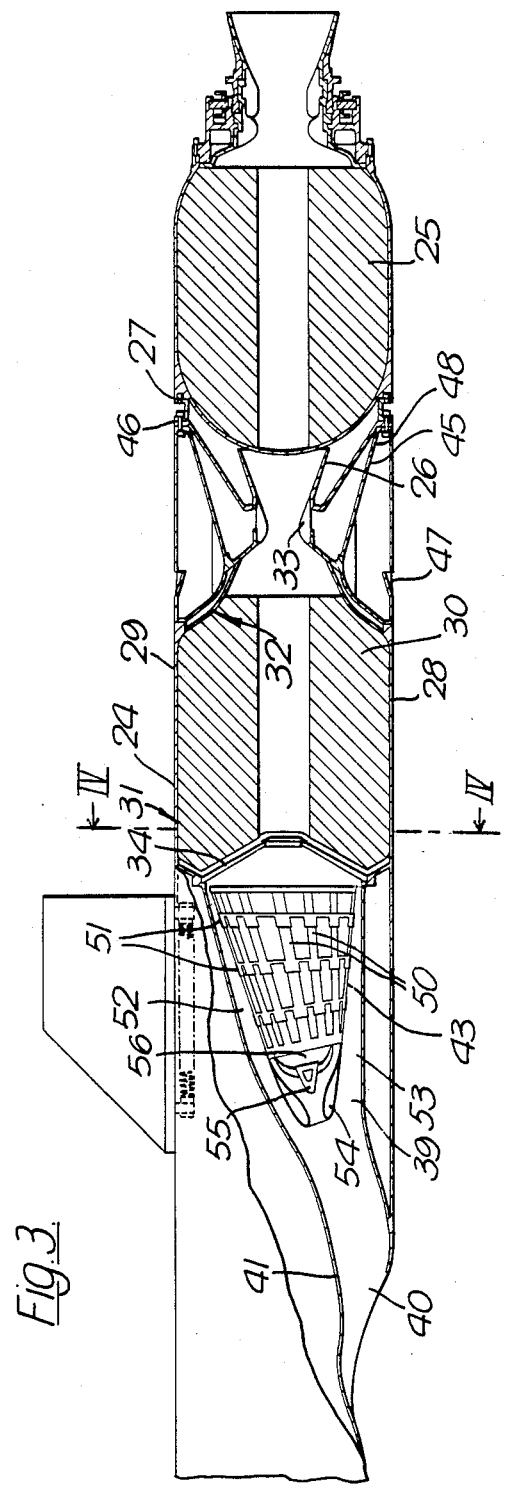
FIG. 3 is an enlarged view of part of FIG. 2.

In FIGS. 1 and 2 there is shown a rocket missile 10 which normally flies in the attitude illustrated in FIG. 2 and which is provided with three wings 11, 12, 13 at its middle for providing lift and with further canard wings 14, 15, 16 at its forward end for controlling the attitude of the missile. Both the canard wings and the lifting wings are of curved profile and pivoted about axes 17, 18 which are fore and aft of the missile. This allows the wings to be folded flush with the missiles cylindrical surface during launching, such as from a submarine torpedo tube, and to be deployed during flight of the missile. At the forward portion 19 of the missile are located a guidance and control module 21, a warhead 22 and a liquid fuel tank 23. The missile is provided at its rear end with a propulsion assembly 24 which can be seen in more detail by referring also to FIG. 3.

The propulsion assembly 24 comprises a solid propellant rocket boost unit 25, which is used to provide the initial acceleration of the missile and which is subsequently detached from the missile nozzle 26 by detonating a circumferential array of explosive bolts 27. Upstream of the nozzle 26 is a chamber 28 whose outer wall 29 is a cylinder made from helically wound and welded maraging steel strip and which forms part of the rocket casing. The chamber 28 is filled with a solid fuel rocket propellant 30 and lined with an ablative lining 31. The ablative lining is of a type well known per se and could for example, comprise either a silicone elastomer such as Dow Corning 93-104 or a matrix of silica fibres impregnated with phenolic resin such as Phenolic Refrasil sold by The Chemical Insulating Co. Ltd.

After detachment of the boost rocket, the missile control system initiates the ignition of the solid fuel rocket propellant which progressively burns and develops, via the discharge nozzle 26, a propulsive thrust for accelerating the missile to speeds in excess of Mach. 2.0. The ablative lining 31 gradually decomposes under the effects of the burning propellant but lasts sufficiently long to prevent the burning propellant from deleteriously affecting the chamber wall. The nozzle throat 32 is fitted with an ablative liner upstream of the nozzle throat and the throat itself is fitted with a molybdenum liner 33 to withstand erosion by the exhaust gases.

Figure 4:
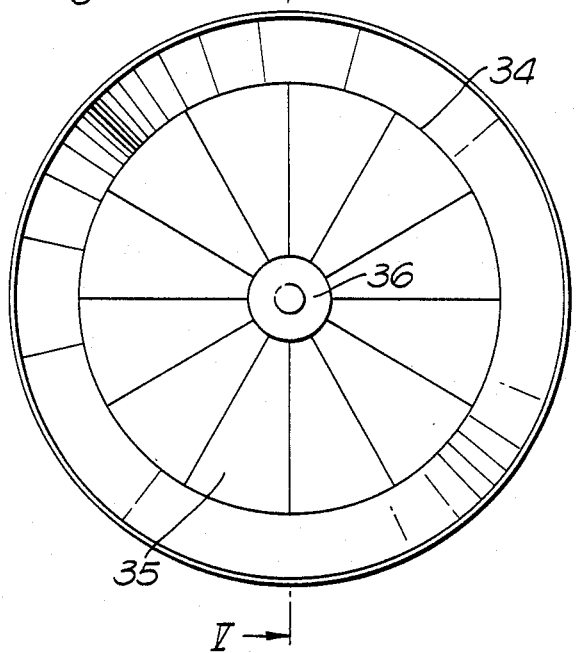
FIG. 4 is an enlarged view of a section on the line IV—IV of FIG. 3.
Figure 5:
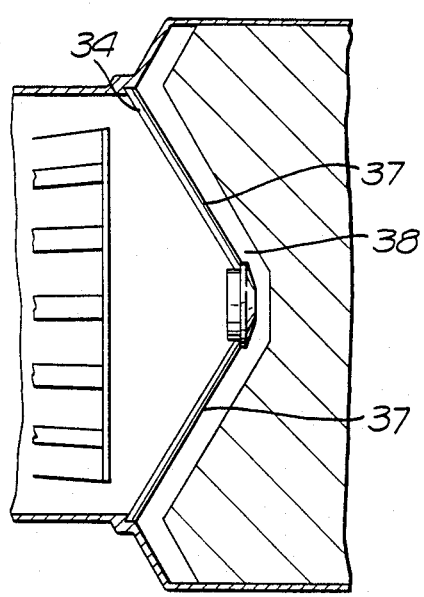
FIG. 5 is a view in the direction V—V of FIG. 4.

The pressure generated by the burning propellant is reacted by a generally convex pressure diaphragm 34 whose detail construction can be more readily seen from FIGS. 4 and 5.

The diaphragm comprises basically of a circumferential array of titanium sectors 35 which abut together to form a convex cone of large cone angle and which is closed by a central plug 36. The cone and plug are overlaid on the pressure surface with a single layer of glass fibre reinforced plastic 37 to ensure the sectors remain correctly aligned and abutted during assembly. The fibre reinforced plastic 37 is protected by a further layer of ablative lining 38.

Upstream of the pressure diaphragm is a passage 39 communicating with a chin type inlet 40 adjacent a central waisted portion 41 of the rocket casing. The inlet 40 is normally closed by a shield 42 which smoothly fairs the inlet into the cylindrical contour of the rocket. The shield is blown away by explosive retaining bolts not shown but well-known per se as soon as the rocket fuel propellant has completed its burning. Ram air then pressurizes the passage which fractures the diaphragm into disposable pieces which are ejected through the missile nozzle 26. The subsequent flow of air through the passage, which is shaped as a diffuser, supports the combustion of further fuel supplied to a flameholder 43 disposed within the passage 39. This further fuel is stored in the tank 23 adjacent the waisted portion of the rocket. The combustion process continues in the chamber 28 which is vacant after the burning of the solid fuel rocket propellant. The discharge nozzle 45 for the products of the ramjet combustion process is made operative after burning of the solid rocket fuel propellant by detonating a further ring of explosive bolts 46 which releases the rocket discharge nozzle 32. The ramjet discharge nozzle 45 is cooled by virtue of free stream air flowing through apertures 47 in the rocket casing, impinging on and film cooling the outer surface of the nozzle 45. Flow through the discharge nozzle 32 entrains the film cooling flow via orifices 48.

The steel outer wall of the combustion chamber is cooled during this ramjet combustion process, which can be of considerable duration, by the free stream of air flowing over the surface of the missile. For this cooling to be effective it is important that there are no structures upstream of the chamber which adversely disturb the airflow over the outer surface of the chamber wall. It is also important that any cable runs that have been utilized in connection with firing of the boost rocket, vectoring of the thrust nozzle of the boost rocket, or separation of the boost rocket from the missile or ignition of the solid fuel rocket propellant are housed so that they do not interfere with the cooling of or heat transfer across the chamber wall. This is conveniently achieved by utilizing thin cables secured with adhesive to the outer casing of the rocket or alternatively running in longitudinal grooves in the rocket casing if it is to be launched from a closely fitting lauching tube.

The cables are torn away at the time of ignition of the ramjet combustion system on release of the ramjet nozzle. This is not a problem because after this time the cables are no longer required.

A feature of the ramjet construction is the incorporation of the flame holder 43 into the diffusing passage. The flame holder 43 comprises a tubular assembly of longitudinally extending peripherally spaced longerons 50 and longitudinally spaced hoops 51. The hoops 51 and longerons 50 define between them a number of openings 52 to direct air flowing through the passage 53 on the outside of the assembly inwardly through the openings for discharge inside the assembly. At the head of the assembly is an intake mouth 54 downstream of which is located a fuel discharge nozzle 55. The flame holder is disposed within the diffuser so that the local air velocity at intake mouth is about Mach 0.7 and the intake mouth has shaped side walls to diffuse air flowing through the mouth into the assembly to a suitable speed for stailizing a flame in a pilot combustion zone 56 downstream of the intake mouth. The air flow through the passage 53 around the intake mouth is diffused to a velocity of Mach 0.5 as it flows past the mouth and as portions of the air flow progressively enter the assembly through openings 52 at successive axial positions along the assembly they are further diffused to a lower velocity Mach 0.25 inside of the assembly. This diffusion is achieved by shaping the walls of successive pairs of hoops 51 to define between them diffusion passages and to take account of any effect of the presence of the langerons 50. In addition there is a progressive diffusion within the passage 53 from Mach 0.5 downstream of the intake mouth to Mach 0.25 at the end of the flame holder. As the air flow through the assembly it is progressively mixed with fuel introduced from the discharge nozzle 55 and ignited so that at the outlet from the flame holder a well developed flame front enters the rocket fuel propellant chamber 28.

It will be appreciated that several modifications could be incorporated into the missile described. In particular the boost rocket can be regarded as an auxiliary feature not necessary for a missile of shorter range and the solid fuel rocket propellant could be replaced by a liquid fuel rocket propellant. The rocket illustrated has the intake adjacent a central waisted portion so as to facilitate launch from a launching tube but there is no reason why, for other means of launching, the inlet should not be placed alongside a generally cylindrical rocket casing.

It will be particularly understood that whilst the above arrangement relates to a missile there is no reason why the warhead should not be replaced with reconnaisance equipment or the rocket used as a moving target.

We claim:

1. A rocket having at its rearward end a propulsion assembly, the assembly comprising a chamber structured to accomodate a rocket fuel propellant, a diaphragm disposed at a forward end of the chamber and structured to withstand the pressure of burning rocket fuel propellant within the chamber, a diffusing passage ahead of the chamber and communicating with an air inlet at the side of the rocket, a flame holder disposed within the diffusing passage, said diffusing passage comprising, in flow series, a supersonic diffuser at said air inlet, and a subsonic diffusion passage, said flame holder being disposed within the subsonic diffusion passage, the diaphragm being disposable following use of the rocket fuel propellant to allow combustion within the chamber of further fuel supplied to the flame holder with air received from the air inlet and wherein the chamber wall is part of the rocket casing and is directly cooled during said combustion by the passage of air past the rocket, characterized in that said disposable diaphragm comprises an array of generally triangular segments closely fitted together to define a shallow angle cone with a central aperture at the apex of the cone and having a plug to close the aperture, the cone being overlaid on its outer surface with a layer of fibre reinforced resin and a further layer of an ablative coating.

2. A rocket as claimed in claim 1 and characterized in that said flame holder comprises a perforated unitary tubular assembly of longitudinally extending peripherally spaced longerons and longitudinally spaced hoops attached to the longerons, said longerons and hoops defining therebetween a number of openings for the passage of air, the hoops being shaped to deflect, in operation, air flowing along the outside of the assembly inwards through the openings for discharge inside the assembly and to diffuse this air to a lower velocity within the assembly, there being an intake mouth for the assembly at the upstream end thereof, a fuel discharge nozzle at the downstream end of the mouth and the sides of the mouth being shaped to diffuse, in operation, air flowing through the mouth into the assembly to establish a pilot combustion zone at the upstream end of the assembly.

* * * * *